US006254914B1

(12) United States Patent
Singh et al.

(10) Patent No.: US 6,254,914 B1
(45) Date of Patent: Jul. 3, 2001

(54) PROCESS FOR RECOVERY OF CORN COARSE FIBER (PERICARP)

(75) Inventors: Vijay Singh, North Wales, PA (US); Steven R. Eckhoff, Mahomet, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/345,018

(22) Filed: Jul. 2, 1999

(51) Int. Cl.[7] .......... A23L 1/48
(52) U.S. Cl. .......... 426/482; 426/478; 426/479; 426/481; 426/618; 127/43; 536/128
(58) Field of Search .......... 426/18, 31, 549, 426/618, 478, 479, 481, 482; 127/43; 536/128

(56) References Cited

U.S. PATENT DOCUMENTS

| | | | | |
|---|---|---|---|---|
| 2,543,281 | * | 2/1951 | Ferrin . | |
| 3,928,631 | * | 12/1975 | Freeman et al. | 426/18 |
| 4,181,534 | | 1/1980 | Headley | 127/67 |
| 4,181,747 | * | 1/1980 | Kickle et al. | 426/615 |
| 4,181,748 | * | 1/1980 | Chwalek et al. | 426/623 |
| 4,486,451 | | 12/1984 | Linton | 426/31 |
| 4,738,772 | * | 4/1988 | Giesfeldt | 209/2 |
| 4,757,948 | * | 7/1988 | Nonaka et al. | 241/7 |
| 5,073,201 | * | 12/1991 | Giesfeldt et al. | 127/67 |
| 5,843,499 | * | 12/1998 | Moreau et al. | 426/2 |

OTHER PUBLICATIONS

Joslyn 1970 Methods in Food Analysis Academic Press New York pp. 215–221.*

Alexander, R.J.; "Corn Dry Milling: Processes, Products, and Applications";pp. 351–376 in : *Cprm: Chemistry and Technology*; S.A. Watson and P.E. Ramstad, eds. American Association of Cereal Chemists; St. Paul, MN; 1987.*

Blanchard, P.; "Technology of Corn Wet–Milling and Associated Processes"; pp. 92–99 in Elsevier Science Publishers; Amsterdam The Netherlands; 1992.*

Doner, L.W. and Hicks, K.B.; "Isolation of Hemicellulose from Corn Fiber by Alkaline Hydrogen Peroxide"; Cereal Chem. 74(2); pp. 176–181; 1997.*

Whistler, R.L.; "Hemicelluloses" in: Industrial Gums; R.L Whistler and J.N. BeMiller, eds; Academic Press; New York, pp. 295–308; 1993.*

Singh, V. and Eckhoff, S.R.; Effect of Soak Time, Soak Temperature and Lactic Acid on Germ Recovery Parameters; Cereal Chemistry 73(6); pp. 716–720; 1996.*

Singh, V. and Eckhoff, S.R.; Economics of Germ Pre–separation for Dry Grind Ethanol Facilities; Ceral Chemistry 74(4); pp. 462 466; 1997.*

(List continued on next page.)

*Primary Examiner*—Carolyn Paden
(74) *Attorney, Agent, or Firm*—Greer, Burns & Crain Ltd.

(57) ABSTRACT

A method of recovering corn coarse fiber by flotation, which features the use of a hydrocyclone, or other separating machinery, in which the specific gravity of the slurry contained therein has been increased to approximately 12–14 Baumé so that the corn coarse fiber is of a lighter density than the remainder of the slurry. Therefore, the corn coarse fiber can be separated from the remainder of the slurry because it floats to the top of the slurry. If the present pericarp recovery process is added to a modified dry-grind ethanol production line, a high value co-product (the pericarp) is added to the other co-products and the end-product of ethanol, which can all be sold, and the economic efficiency of the plant is increased. More specifically, the present invention provides a process for recovering corn coarse fiber including the steps of: soaking corn in water to loosen the attachments of various grain components therein to each other, degerminating the soaked corn to strip the corn coarse fiber and the germ away from the endosperm, recovering the germ, and recovering the corn coarse fiber by flotation.

19 Claims, 2 Drawing Sheets

OTHER PUBLICATIONS

S.R. Eckhoff et al.; "Comparison Between Alkali and Conventional Corn Wet–Milling:" 100–g Procedures; *Cereal Chemistry;* 76(1); pp. 96–99; 1999.

V. Singh and S.R. Eckhoff; "Economics of Germ Preseparation for Dry–Gring Ethanol Facilities;" *Cereal Chemistry*; 74(4): pp. 462–466; 1997.

V. Singh and S.R. Eckhoff; "Effect of Soak Time, Soak Temperature, and Lactic Acid on Germ Recovery Parameters;" *Cereal Chemistry*; 83(6): pp. 716–720; 1996.

Evelyn J. Weber; *Corn: Chemistry and Technology; American Assoc. of Cereal Chemists*; Chapter 10; pp. 311–312; 337–339; and 377–384; ; 1994; "Lipids of the Kernel;" and James B. May; "Wet Milling: Process and Products;" *American Assoc. of Cereal Chemists, Inc.*; Chapter 12; St. Paul. MN.

R. Carl Hoseney; "Wet Milling: Production of Starch, Oil and Protein;" *Principles of Cereal Science and Technology*; Chapter 7; pp. 147–156; 1986.

E.J. Rogers, et al.; "Identification and Quantitation of γ–Oryzanol Components and Simultaneous Assessment of Tocols in Rice Bran Oil;" JAOCS, vol. 70, No. 3; pp. 301–307; 1993.

Robert A. Norton; "Isolation and Identification of Steryl Cinnamic Acid Derivatives from Corn Bran;" *Cereal Chemistry*; 71(2); pp. 111–117; 1994.

Larry M. Seitz; Stanol and Sterol Esters of Ferulic and ρ–Coumaric Acids in Wheta, Corn, Rye, and Triticale; *37 J. Agric. Food Chem.*; 37, pp. 662–667; 1989.

Robert A. Norton; Quantitation of Steryl Ferulate and ρ–Coumarate Esters from Corn and Rice; Lipids; vol. 30, No. 3 (1995).

* cited by examiner

PROCESS FOR RECOVERY OF CORN COARSE FIBER (PERICARP)

STATEMENT OF GOVERNMENT INTEREST

This invention was made with Government support under Grant No. 96-0094-01ECK, awarded by ICMB (Illinois Corn Marketing Board). The Government has certain rights to this invention.

The present invention relates generally to the recovery of corn coarse fiber (pericarp) from corn, and more particularly to a method for the recovery of corn coarse fiber by flotation. Preferably, the present method of recovery by flotation is one step of a modified dry-grind process used for producing ethanol.

BACKGROUND OF THE INVENTION

Corn coarse fiber (also known as pericarp or bran) is the outer covering of a kernel of corn, and is a product that can be used as feedstock for the production of such end products as Corn Fiber Gum (CFG) and Corn Fiber Oil. Corn Fiber Gum can be used in both food and non-food applications as a film former, an emulsifier, a low-viscosity bulking agent, an adhesive, or as a substitute for gum Arabic. Corn Fiber Oil has three natural phytosterol compounds (ferulate phytosterol esters or “FPE,” free phytosterols or “St,” and phytosterol fatty acyl esters or “St:E”) that have been found to lower serum cholesterol in blood, and therefore can be used as a nutraceutical product. Such products command high dollar values in the market (approximately $8.00 to 9.00 per pound).

Currently, there are the following three primary methods for recovering pericarp: (1) wet-milling; (2) dry-milling; and (3) alkali debranning. In the corn wet-milling process, corn kernels are steeped for a period of between twenty-four and thirty-six hours in a warm solution of water and sulfur dioxide. Such steeping softens the kernels for grinding, removes soluble materials (which are dissolved in the steep water), and loosens the protein matrix within which the starch is embedded. The mix of steeped corn and water is fed to a degerminating mill, which grinds the corn such that the kernels are torn open and the germ is released. As the germ is lighter than the remainder of the slurry, it floats to the top of the slurry. This fact that the germ is of a lighter density than the remainder of the slurry enables the germ to be separated out from the slurry through the use of a hydrocyclone. The remaining slurry (which now lacks the germ, but includes starch, protein and fiber) is finely ground using an attrition mill to liberate the remaining endosperm attached to the fiber and to totally disrupt the endosperm cellular structure. The finely ground slurry is then passed through a series of screens to separate the fiber out of the slurry, and to wash the fiber clean of starch and protein. The washed fiber is then de-watered using fiber presses, and is finally dried. In this process, fine fiber (or the cellular material inside of the corn kernel) is also recovered with the pericarp (or corn coarse fiber). One disadvantage of obtaining pericarp by using a wet-milling process is that such processes involve large capital expenditures in equipment.

In the dry-milling process, clean corn is adjusted to about a twenty percent moisture content, and is then processed in a degerminator. In the degerminator, the moist corn is treated with an abrading action that strips the bran (pericarp) and germ away from the endosperm while still leaving the endosperm intact. The degerminator is set up so that the large pieces of endosperm proceed through to the end of the degerminator, while the pericarp and germ pass through screens on the underside of the degerminator. The mix of pericarp and germ is dried, cooled, and aspirated to separate the pericarp and the germ from each other. One disadvantage of obtaining pericarp from the above-described dry-milling process is that the pericarp obtained contains only low amounts of Corn Fiber Oil therein. Also, the dry-milling process just described does not result in ethanol production, so there is no additional income from ethanol sales.

In the third method of recovering pericarp from corn, alkali debranning, the pericarp is recovered by the chemical action of an alkali such as calcium hydroxide, potassium hydroxide, or sodium hydroxide. The process involves soaking corn kernels for a short period of time (between one and sixty minutes) in a hydroxide solution at temperatures ranging from ambient to about 100° C. The alkali reacts with the connecting tissue between the endosperm and the pericarp, and loosens the coating so that mechanical or hydraulic action on the corn kernels results in the removal of the pericarp from the intact whole corn kernel. In this process, pure pericarp is recovered with no fine fiber (cellular material). However, the disadvantages of this process are that there are special disposal procedures required for the alkali, and that there is also a relatively high ash content in the pericarp.

One of the many end-products in which corn is used as the base-product is ethanol. Currently, ethanol is being produced from corn mainly via two different processes—a wet mill process and a dry-grind process (which is not to be confused with the dry-milling process described above). In wet milling, corn is separated into its different components (germ, fiber, protein, and starch) using various separation techniques, such as described above. The clean starch is then cooked, saccharified, fermented, and distilled to make ethanol. Wet milling is a very capital intensive process, but these costs are offset by the resulting high value co-products of the process (such as corn oil produced from the germ, gluten meal from the protein, and gluten feed from the fiber and solubles).

In the other primary process for producing ethanol, the dry-grind process, raw corn is ground, mixed with water, cooked, saccharified, fermented, and then distilled to make ethanol. However, while the only fermentable product in corn is the starch, the other non-fermentable components of the corn (the germ, the fiber, and the protein) are carried through the remainder of the dry-grind processing steps, and are recovered at the end as distillers dried grains with solubles, or DDGS. In current dry-grind processes, neither the germ nor the pericarp are recovered separately, but instead these components end up as part of the DDGS.

The dry-grind process is not a very capital intensive process (when compared with the wet-mill process), but the primary co-product produced (distillers dried grains, or DDG, which is a livestock feed product) is a relatively low value product. Accordingly, because of the low value co-product, the net corn cost is higher in dry-grind ethanol plants that it is in wet-mill plants. Thus, when corn prices increase, it is very difficult to economically justify operating dry-grind ethanol plants that can only produce low value co-products with the ethanol. Thus, many dry-grind ethanol plants shut down or reduce their production volume when corn prices increase.

The present inventors have realized that one strategy for reducing the net corn cost in dry-grind ethanol plants is to recover co-products other than DDGS, especially non-fermentable co-products. Previously, the present inventors studied modifications to conventional dry-grind ethanol plants that enabled the recovery of the germ. This modified dry grind ethanol process is known as the "Quick Germ" process, and involves soaking whole kernel corn in water before degermination. The germ is then recovered by germ hydrocyclones, and the remainder of the corn is ground and processed for ethanol production. Economic analysis has shown that the "Quick germ" process has the potential to reduce the cost of ethanol production by between 0.33 to 2.69 cents/liter. Although such cost reductions (primarily realized through the sale of the germ) have been helpful, further cost reductions are still necessary for dry-grind ethanol plants to remain competitive.

One object of the present invention is to provide an improved method of recovering pericarp from corn.

An additional object is to provide a method of recovering pericarp using flotation.

Another object of the present invention is to provide a method for extracting a high value co-product (pericarp) from dry-grind ethanol production processes so that such processes can be made more economically viable, especially when corn prices increase.

Still another object of the present invention is to provide a method of recovering pericarp without the disadvantages described above.

Other objects of the present invention will be discussed or will become apparent from the following description.

BRIEF SUMMARY OF THE INVENTION

The above-listed objects are met or exceeded by the present method of recovering corn coarse fiber by flotation, which features the use of a hydrocyclone, or other separating machinery, in which the specific gravity of the slurry contained therein has been increased to be greater than approximately 11 Baumé so that the corn coarse fiber is of a lighter density than the remainder of the slurry, and therefore the corn coarse fiber can be separated from the remainder of the slurry because it floats to the top of the slurry. If the present pericarp recovery process is added to a modified dry-grind ethanol production line, a high value co-product (the pericarp) is added to the other co-products and the end-product of ethanol, which can all be sold, and the economic efficiency of the plant is increased. The economic efficiency of the plant is also increased because, by removing the germ and the pericarp prior to fermentation, the amount of non-fermentable materials in the fermentor is decreased. Thus, the capacity of the fermentors is effectively increased.

More specifically, the present invention provides a process for recovering corn coarse fiber including the steps of: soaking corn in water to loosen the attachments of various grain components therein to each other, degerminating the soaked corn to strip the corn coarse fiber and the germ away from the endosperm, recovering the germ, and recovering the corn coarse fiber by flotation. Preferably, the corn coarse fiber is recovered through the use of a hydrocyclone in which the specific gravity of the slurry therein has been increased to be greater than approximately 11 Baumé, and more preferably to within the range of approximately 12–14 Baumé.

Additionally, the present invention also provides a process for a corn product removal process comprising the steps of: soaking corn in water to loosen the attachments of various grain components therein to each other, degerminating the soaked corn to strip the corn coarse fiber and the germ away from the endosperm, recovering the germ, recovering the corn coarse fiber by flotation, fermenting the remaining slurry, and distilling the fermented liquid to produce ethanol.

Further, the present invention also provides a process for recovering corn coarse fiber during a dry-grind ethanol production process, where that recovery process includes the steps of: soaking corn in chemical-free water to loosen the attachments of various grain components therein to each other; degerminating the soaked corn to strip the corn coarse fiber and germ away from the endosperm; and recovering the corn coarse fiber.

BRIEF DESCRIPTION OF THE DRAWINGS

Preferred embodiments of the present invention are described herein with reference to the drawings wherein.

DETAILED DESCRIPTION OF THE INVENTION

Figure 1:
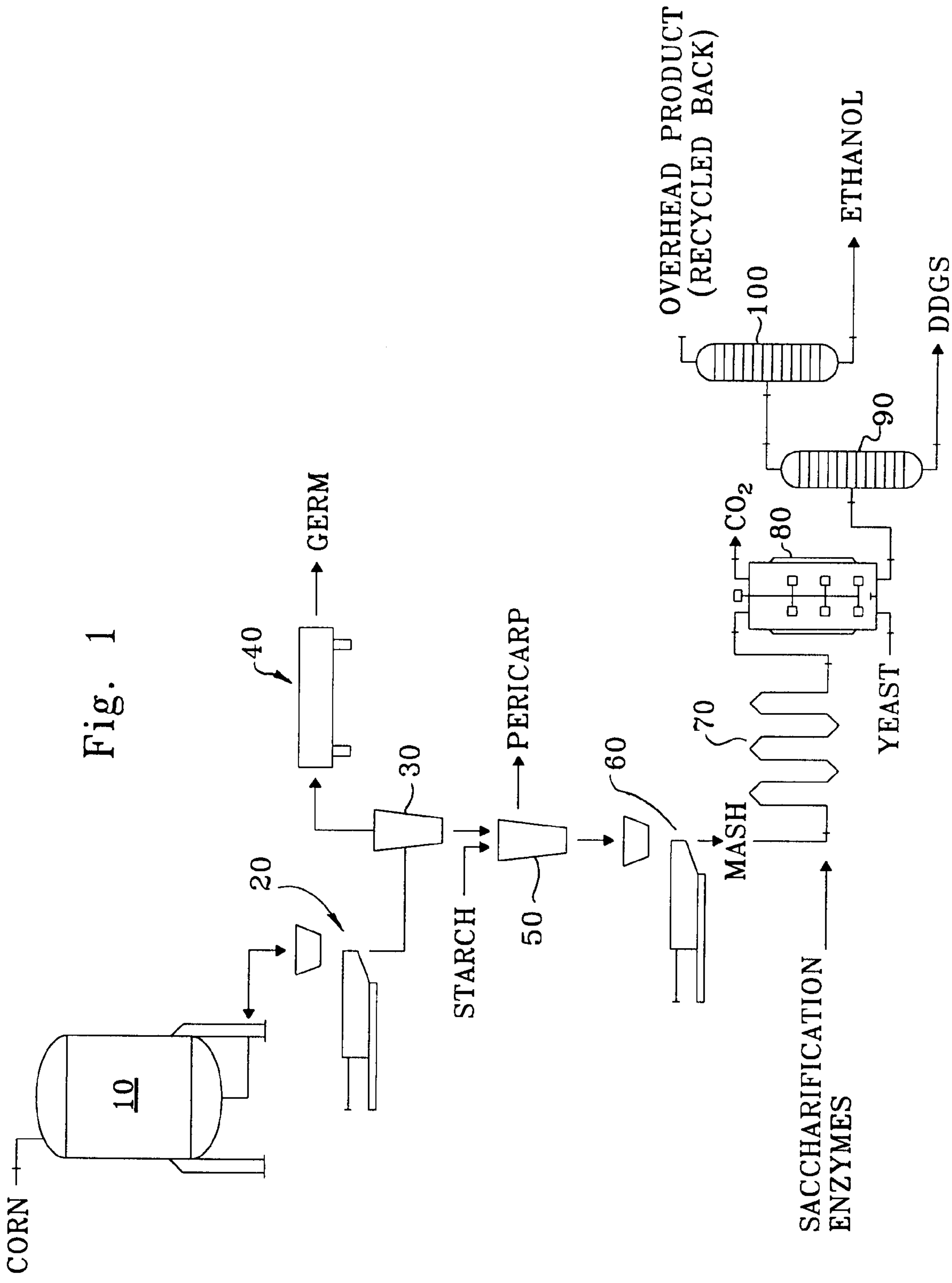
FIG. 1 shows the preferred method of recovering pericarp from corn.

Referring now to FIG. 1, the preferred method of recovering pericarp from corn will be described. This method, which is basically a modification of conventional dry-grind ethanol production methods, is called the "Quick Fiber" process. First, raw corn kernels (preferably dent corn, but other varieties are also acceptable) are fed into a water filled vat 10 for soaking. Preferably, the corn kernels are soaked for between 3 and 14 hours at a temperature of between 45 and 75° C., and more preferably the kernels are soaked for approximately 12 hours at a temperature of approximately 59° C. It is also preferred that distilled water be used in the vat 10. However, water recycled from other steps of the process may also be used for soaking the corn, including the thin stillage produced at the downstream end of the process. The ratio of corn to water is preferably within the range of approximately 1:1.5 and 1:2.

After soaking, the excess water is removed from the corn. Next, the kernels are fed into a degermination mill 20 (such as a Bauer mill) where they are ground so that the pericarp and the germ are stripped away from the endosperm. Preferably, the excess water that was removed from the corn after soaking is recycled into various parts of the process. For example, part of the excess water can be used along with the soaked corn to feed the degermination mill 20 (the water lubricated the mill to prevent it from plugging). Part of this excess water can also be used to wash the germ and fiber (after their removal described below). The remaining water can be used to make the mash, which is further processed to make ethanol (as described below).

After leaving the degermination mill 20, the slurry is fed into a germ hydrocyclone 30, or other similar separating device, where the germ is separated from the remainder of the slurry. During this step of the process, the slurry is preferably tangentially fed into the germ hydrocyclone 30 under pressure. The heavier particles pass through the underflow of the hydrocyclone 30 and the lighter particles that float (such as the germ) are separated out into the overflow of the hydrocyclone 30. The germ floats on top of the slurry when the specific gravity of the slurry is at least approximately 7.5 Baumé, and is preferably between approximately 8–9 Baumé, but is less than approximately 11 Baumé. If the slurry has a specific gravity of less than 7.5 Baumé when measured with a hydrometer, the specific gravity should be increased to the appropriate level through the addition of one or more density increasing material such as corn starch, thin stillage, a salt (e.g. sodium nitrate), and/or sugar syrup (such as high fructose corn syrup or dextrose). The germ from the overflow of the germ hydrocyclone 30 is washed, dewatered and then fed into a germ dryer 40.

The remainder of the slurry, which is now lacking the germ, is fed into a second hydrocyclone, the pericarp hydrocyclone 50. In this pericarp hydrocyclone 50 the pericarp is separated from the remainder of the slurry by flotation. In order to separate the pericarp from the remainder of the slurry, the specific gravity of the slurry must be increased through the addition of one or more ingredients such as corn starch, thin stillage, a salt, and/or sugar syrup (such as high fructose corn syrup or dextrose). Preferably, the specific gravity of the slurry is increased to be greater than approximately 11 Baumé (1.090 sp. gravity), and more preferably the specific gravity is increased to between the range of approximately 12–14 Baumé (1.0903–1.1071 sp. gravity). However, a specific gravity of greater than approximately 16 Baumé is not recommended because at such values the slurry becomes too thick to permit effective removal of the pericarp. Because the pericarp is of a lighter density than the remainder of the slurry, it floats to the top of the pericarp hydrocyclone 50, and can be removed. It is also contemplated that other pericarp separation techniques, which also utilize the density difference between the pericarp and the slurry with its specific gravity increased, may also be utilized. Further, it is also contemplated that the pericarp may be removed by screening. If screening is used, the specific gravity of the slurry need not be increased. However, it should be noted that screening will add to the costs of the production line.

The slurry, which is now lacking both the germ and the pericarp, is next fed into a second grinder 60 for fine-grinding it into a mash. Saccharification enzymes are then added to the mash, and this mixture is then fed into the saccharification area 70 where it is saccharified (i.e., the complex carbohydrates, such as starch, are converted into glucose and maltose through the use of enzymes or acids). From here, yeast is added to the mash, and it is fermented in a fermentor 80. Then, it passes to a stripping/rectifying column 90, and finally it passes into a dehydration column 100 where it is distilled into ethanol. One co-product coming out of the stripping/rectifying column 90 is distillers dried grains with solubles (DDGS). The byproduct of the dehydration column 100 is an overhead product, such as benzene, that is used to remove water from the ethanol. The overhead product is then recycled back into the process.

By removing the pericarp and the germ from the slurry, instead of letting it pass through all of the process steps as in conventional dry grind processes, the amount of non-fermentable materials passing through the fermentor is decreased (both the pericarp and the germ are non-fermentables). Accordingly, the capacity of the fermentors is effectively increased (because the same amount of corn feed product will results in less product being introduced into the fermentors and the later process steps). It has been found that the pericarp alone accounts for approximately 6–7% of the volume of the corn. Thus, if the present invention is utilized to remove the pericarp only, there will be a 6–7% decrease in the volume of material being fed into the fermentors (when compared to the same amount of corn feedproduct in a standard dry-grind plant). Obviously, greater decreases in the volume of materials being fed into the fermentors will result when the germ is also removed (as well as the pericarp).

Figure 2:
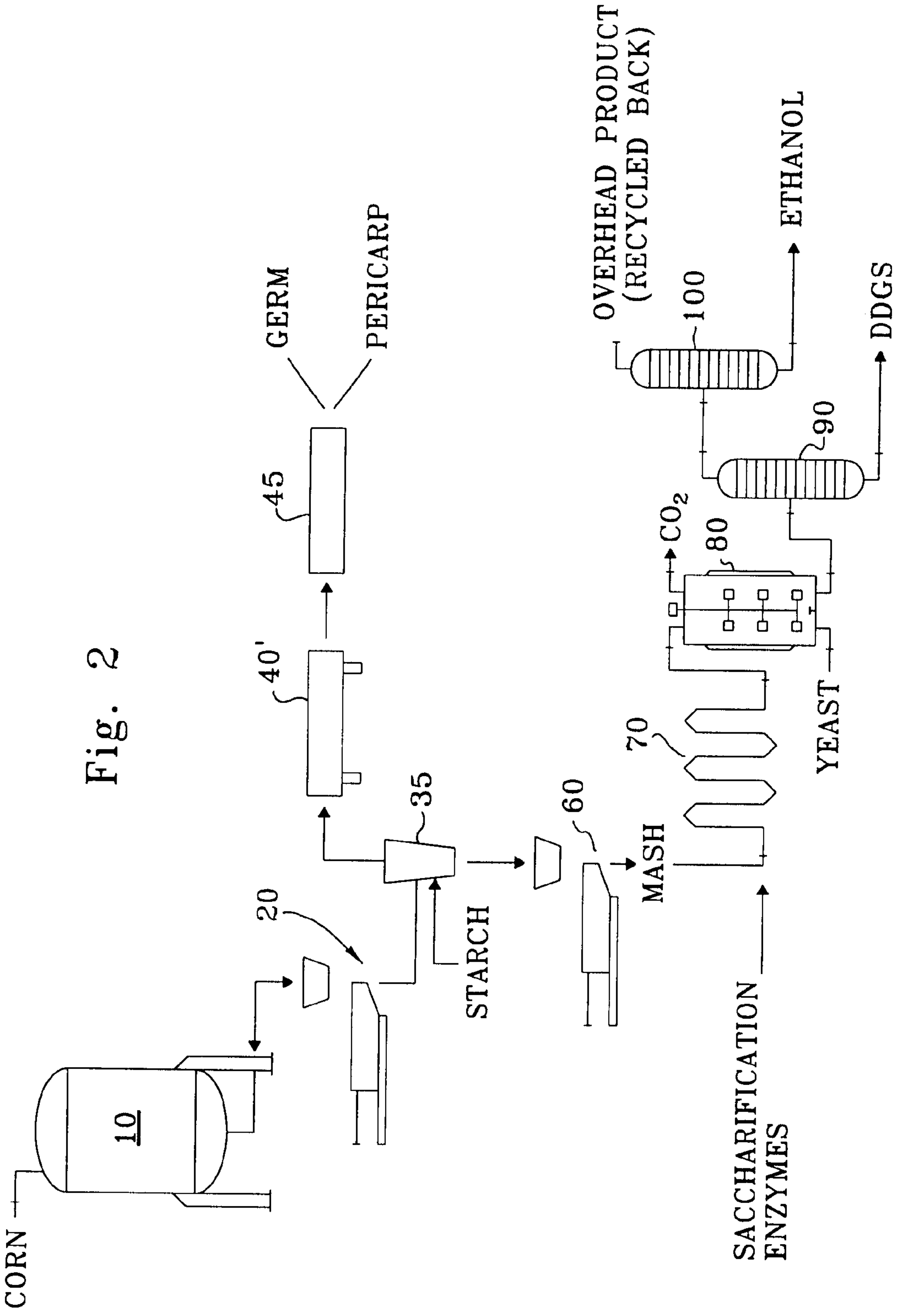
FIG. 2 shows a modification of the preferred method shown in FIG. 1.

Referring now to FIG. 2, a modified version of the method of FIG. 1 will be described. Similar components to those shown in FIG. 1 have been given the same index numbers. As the primary difference between the modified method of FIG. 2 and the FIG. 1 method relates to the hydrocyclones, this is the only portion of the method that will be described. In the FIG. 2 method, only a single hydrocyclone 35 is used (instead of the two hydrocyclones 30 and 50 of the FIG. 1 method). In the hydrocyclone 35, the specific gravity is increased as described above with respect to hydrocyclone 50. Both the germ and the pericarp, intermixed with each other, are floated out of the hydrocyclone 35, are washed, dewatered, and are then fed into a dryer 40'. Next, the germ and the pericarp are separated from each other by using an aspirator 45. The remainder of slurry, without the germ and the pericarp, continues to the second grinder 60, and the ethanol production process continues in the same manner as described above with reference to the FIG. 1 method.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A process for recovering corn coarse fiber comprising the steps of:

soaking corn in water to loosen the attachments of various grain components therein to each other;

degerminating the soaked corn to strip the corn coarse fiber and germ away from the endosperm;

recovering the germ by increasing the specific gravity of a slurry including the germ and corn coarse fiber therein to approximately within the range of 7.5 to 11 Baumé for removal of the germ; and recovering the corn coarse fiber by increasing the specific gravity of a slurry including the corn coarse fiber therein to approximately within the range of 11–16 Baumé so that the corn coarse fiber floats to the top of said slurry for removal of said corn coarse fiber.

2. The process of claim 1, wherein said step of soaking the corn comprises soaking the corn in distilled water.

3. The process of claim 1, wherein said step of soaking the corn comprises soaking the corn for approximately 12 hour s at a temperature of approximately 59° C.

4. The process of claim 1, wherein said step of degerminating the soaked corn comprises grinding the soaked corn.

5. The process of claim 1, wherein said step of recovering the germ comprises using germ hydrocyclones.

6. The process of claim 1, wherein the specific gravity of said slurry is increased by adding at least one of the following to said slurry: corn starch, a salt, and sugar syrup.

7. The process of claim 1, wherein the specific gravity of said slurry is approximately within the range of 12–14 Baumé.

8. The process of claim 1, wherein said corn coarse fiber. is separated from said slurry using hydrocyclones.

9. The process of claim 1, wherein said step of recovering the germ and said step of recovering the corn coarse fiber are performed together by flotation.

10. The process of claim 9, further comprising the steps of:

drying the combination of germ and corn coarse fiber; and separating the germ and the corn coarse fiber from each other using an aspirator.

11. The process of claim 1, wherein said step of recovering said germ is performed prior to said step of recovering said corn coarse fiber.

12. A corn product removal process comprising the steps of:

soaking corn in water to loosen the attachments of various grain components therein to each other;

degerminating the soaked corn to strip the corn coarse fiber and germ away from the endosperm;

recovering the germ by increasing the specific gravity of a slurry including the germ and corn coarse fiber therein to approximately within the range of 7.5 to 11 Baumé for removal of the germ;

recovering the corn coarse fiber by increasing the specific gravity of a slurry including the corn coarse fiber therein to approximately within the range of 11–16 Baumé so that the corn coarse fiber floats to the top of said slurry for removal of said corn coarse fiber;

fermenting remaining slurry; and distilling fermented liquid to produce ethanol.

13. The process of claim 12, wherein the specific gravity of said slurry is approximately within the range of 12–14 Baumé.

14. The process of claim 13, wherein the specific gravity of said slurry is increased by adding at least one of the following to said slurry: corn starch, a salt, and sugar syrup.

15. The process of claim 13, wherein said corn coarse fiber is separated from said slurry using hydrocyclones.

16. The process of claim 12, wherein said step of recovering the germ and said step of recovering the corn coarse fiber are performed together by flotation.

17. The process of claim 16, further comprising the steps of:

drying the combination of germ and corn coarse fiber; and separating the germ and the corn coarse fiber from each other using an aspirator.

18. The process of claim 12, wherein said step of recovering said germ is performed prior to said step of recovering said corn coarse fiber.

19. A process for recovering corn coarse fiber during a dry-grind ethanol production process, said recovery process comprising the steps of:

soaking corn in chemical-free water to loosen the attachments of various grain components therein to each other;

degerminating the soaked corn to strip the corn coarse fiber and germ away from the endosperm; and recovering the corn coarse fiber by increasing the specific gravity of a slurry including the corn coarse fiber therein to approximately within the range of 11–16 Baumé so that the corn coarse fiber with the germ floats to the top of said slurry for removal of said corn coarse fiber with the germ.

* * * * *